UNITED STATES PATENT OFFICE 2,556,145

CHLORINATED RUBBER AND EPOXIDIZED OILS

Warren D. Niederhauser, Philadelphia, Pa., assignor to Rohm & Haas Company, Philadelphia, Pa., a corporation of Delaware No Drawing. Application November 23, 1948, Serial No. 61,745

5 Claims. (Cl. 260—736)

This invention relates to plastic compositions containing halogenated rubber and to a means of stabilizing them against discoloration and embrittlement.

Compositions—particularly coating compositions—which are based on halogenated rubber, either as the sole film-forming component or combined with other resinous materials, are characterized by exceptional resistance to chemicals. Since, however, such compositions discolor badly and become brittle on exposure to actinic rays, their use has been limited to those industrial applications where a change in color is unimportant or where the composition is shielded from actinic rays. Attempts to stabilize the coatings, films or layers of halogenated rubber heretofore have been relatively unsuccessful because of the fugitive nature of the materials employed as stabilizers.

It has now been found that epoxidized vegetable oils not only plasticize halogenated rubber and prevent embrittlement thereof but, in addition, they stabilize it against discoloration even on direct exposure to ultraviolet light. Thus, the epoxidized oils are both plasticizers and stabilizers for coating compositions and films containing halogenated rubber.

These epoxidized vegetable oils constitute a comparatively new class of compounds which can be prepared by the process described by Findley et al. in "The Journal of the American Chemical Society," volume 67, pages 412–444 (1945). In general, the epoxidized oils are those containing one or more oxirane rings within their molecular structure. Thus, they contain one or more oxirane rings or epoxy groups,

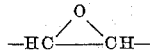

at the points within the molecule which are normally occupied by double bonds in the original, non-epoxidized oils.

The vegetable oils which when epoxidized may be used in practicing the present invention are those glycerides of saturated and unsaturated acids which have a degree of unsaturation represented by an iodine value of from 90 to 205 and in which the fatty acids neither are hydroxylated nor possess conjugated unsaturation. The semidrying vegetable oils, which are primarily glycerides of oleic and linoleic acids, are preferred. Among those oils which may be used are epoxidized peanut, rapeseed, cottonseed, corn, tobacco seed, cucurbit, sunflower, safflower, poppyseed, linseed, perilla, and soybean oils. Of these epoxidized oils, soybean oil is particularly efficient. The effectiveness of the epoxidized oils in stabilizing chlorinated rubber is dependent upon both the concentration in which they are used and the degree to which they have been epoxidized; i. e., the number of epoxy groups that have been introduced. Theoretically, each carbon to carbon double bond of the original vegetable oil can be converted to an epoxy group. In practical operation this will seldom, if ever, be attained but it is desirable that highly epoxidized oils be used so that maximum stability be effected. It is recommended that there be used epoxidized oils containing an average of from 2.5 to 6 epoxy groups per molecule.

As little as 5% epoxidized oil, based on the weight of the halogenated rubber, imparts a substantial degree of color-stabilization and, as the relative amount of epoxidized oil is increased, so also is its effectiveness. The upper limit that can be used is dependent upon the degree of plasticizing action which is desired. Compositions containing as much as 100% epoxidized oils, on the same basis, have a very satisfactory combination of properties and are flexible, adhesive, and stable.

Halogenated rubbers are well-recognized materials which are available commercially. They are the products obtained by halogenating natural rubbers or synthetic rubbers of the diene type such as the copolymers of butadiene and styrene or butadiene and acrylonitrile. The preparation and properties of halogenated rubbers are well-known and have been recorded in many publications including the following: Ellis, "The Chemistry of Synthetic Resins," chapters 54 and 55 (Reinhold Publishing Co., N. Y., N. Y., 1935); Powers, "Synthetic Resins and Rubbers," chapter 15 (John Wiley & Sons, Inc., N. Y. C., 1943); U. S. Patents Nos. 2,302,583; 2,401,194; 2,401,133; and 2,424,920. Chlorinated natural rubber is much the preferred member of the class of halogenated rubbers. It is produced by the action of chlorine on raw or vulcanized rubber any may contain from 30% to 80% chlorine depending on the method of manufacture. The preferred compositions of this invention are those containing a chlorinated natural rubber which has a chlorine-content of 60% to 70%. Such a chlorinated rubber is currently marketed under the trade name Parlon by the Hercules Powder Company and is described in a booklet entitled "Parlon" and identified as "Form 500-76; 7-48." The viscosity of the chlorinated rubber may vary widely but for use in surface-coatings it is preferred to employ a material of relatively low viscosity; for example, one having a viscosity of 4 to 180 centipoises when measured at 25° C. as a 20% solution in toluene. For some purposes, such as the treatment of fabrics, chlorinated rubbers having a viscosity as high as 1200 centipoises, on the same basis, are employed together with epoxidized oils.

Blends of epoxidized oils and halogenated rubbers are made by conventional methods such as stirring, milling, grinding or rolling. Ordinarily, the fluid, epoxidized oil, is added to a solution of the halogenated rubber. Elevated temperatures are, of course, helpful in effecting the blending of the two principal components. Furthermore, other materials such as pigments, fillers, dyes, additional plasticizers, and resins may be mixed into the compositions for specific purposes. Blends of chlorinated rubber and alkyd resins are especially benefited by the addition of small amounts of epoxidized oils. Such blends are characterized by ease of formulation and application, durability, and stability. In this connection the chlorinated rubber is considered as a fortifier for the alkyd resin and, as such, it imparts hardness and drying speed to the latter. The presence of the epoxidized oil assures durability and stability of the coating composition.

The following examples serve to show the nature of this invention and its value.

EXAMPLE 1

*Preparation of epoxidized soybean oil*

Into a flask equipped with mechanical stirrer, thermometer, and dropping funnel were placed 910 cc. of a 40% acetic acid solution of peracetic acid and forty-nine grams of sodium acetate. The flask was placed in an ice bath, stirring was begun, and seven hundred grams of soybean oil was added dropwise to the solution over a period of one hour while the temperature of the solution was maintained at 15° to 20° C. The mixture was thereafter stirred at 15° to 20° C. for three additional hours. The oily layer was separated and washed several times with water and was finally freed of water by being heated on a steam bath under reduced pressure. The epoxidized oil, so prepared, had a viscosity of 2.5 poises and a color of 1 on the Gardner-Holdt scale. The analysis for oxirane oxygen showed that the oil was 75% epoxidized; that is, that 75% of the double bonds in the oil molecule were converted to epoxy groups or oxirane rings.

EXAMPLE 2

*Preparation of epoxidized oils*

One hundred thirty cc. of a 40% acetic acid solution of peracetic acid was placed in a flask equipped with stirrer, thermometer, and dropping funnel. Seven grams of sodium acetate was added, and then one hundred grams of corn oil was added dropwise to the mixture over a period of thirty minutes while the temperature was maintained at 15°–20° C. by the use of an ice bath. Thereafter, the mixture was stirred for three hours at 15°–20° C. The oily layer was separated, washed with water, and dried under reduced pressure on a steam bath. The product was ninety grams of a pale yellow oil having a color of 2— on the Gardner-Holdt scale and a viscosity of 2.6 poises. Analysis showed that 80% of the original double bonds in the corn oil had been converted to oxirane rings.

In an identical manner, cottonseed oil was epoxidized to an extent of 80%. The epoxidized cottonseed oil, weighing 95.5 grams, had a viscosity of 1.8 poises and a color of 3— on the Gardner-Holdt scale. Likewise, peanut oil, when treated in the same way, yielded ninety-one grams of oil which was 75% epoxidized and had a viscosity of 2.0 poises and a color of 1— on the same color scale.

EXAMPLE 3

*Preparation of stabilized coating composition*

A clear coating composition was prepared by mixing 200 grams of a 35% solution of chlorinated rubber (10 centipoise grade) in xylene and 30 grams of epoxidized soybean oil prepared by the process of Example 1 above. This composition was applied to a panel of glass in a film-thickness of 3 mils and was air-dried overnight. It was then exposed to ultraviolet light in an Atlas Fadeometer at 110° F. After 48 hours of continued exposure it was unchanged in appearance, and after 124 hours of exposure the film was only a very light tan in color.

Compositions similar to that described immediately above were prepared from the same chlorinated rubber and other plasticizers in the same ratio. Thus, there was used individually epoxidized corn oil and epoxidized cottonseed oil prepared by the process of Example 2 above. Refined but non-epoxidized soybean oil and dioctylphthalate were likewise employed, all in the same ratio set forth above. Films of the individual compositions, 3 mils in thickness, were prepared, dried, and exposed in the identical manner described above. After 48 hours of exposure the films containing the epoxidized corn and cottonseed oils appeared to be unchanged whereas the film containing the unepoxidized soybean oil was tan and the film containing the dioctyl phthalate was light tan in color. After 124 hours of exposure the film containing the soybean oil was brown; the one containing the dioctyl phthalate was likewise dark and, in addition, was blistered and partially detached from the glass plate. In sharp contrast, the films containing the epoxidized corn and cottonseed oils were only very light tan in color.

EXAMPLE 4

A clear coating composition was prepared by blending 71 parts of a 35% solution of chlorinated rubber (10 centipoise type), 100 parts of a 75% solution in xylol of an alkyd resin, prepared from glycerine, phthalic anhydride and soybean oil fatty acids and having a ratio of glyceryl phthalate to the total weight of the resin of 42%, and 5 parts of epoxidized soybean oil, prepared by the process of claim 1. For comparative purposes a similar composition was prepared from chlorinated rubber and the same alkyd without the epoxidized soybean oil. These two compositions were flowed on glass panels to a wet-thickness of 3 mils and the coated panels were baked for 30 minutes at 300° F., after which they were exposed to ultraviolet light in an Atlas Fadeometer at 110° F. for 48 hours. At the end of this time, inspection showed that the films containing only the chlorinated rubber and alkyd resin were very much discolored whereas the films containing the epoxidized soybean oil together with the chlorinated rubber and alkyd resin were essentially unchanged.

The advantage of the compositions of this invention over similar compositions which do not contain epoxidized oils is evident from the above examples. While the examples stress the use of epoxidized soybean oil, the other epoxidized oils listed above are also effective. The stabilizing and plasticizing properties imparted to halogenated rubber compositions by epoxidized oils now make it possible to extend the use of such compositions to a wide series of new applications. Durable and stable light-colored coating compositions can be prepared with the assurance that they will remain light-colored; and such compositions can be employed successfully where the older kinds of compositions failed by embrittlement and discoloration on exposure to actinic rays.

I claim:

1. A coating composition, characterized by resistance to discoloration on exposure to actinic rays, comprising chlorinated rubber and from 5% to 100%, based on said chlorinated rubber, of a non-conjugated, non-hydroxylated, vegetable oil which contains in each molecule an average of 2.5 to 6.0 epoxy groups of the formula

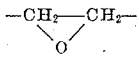

2. A coating composition, characterized by resistance to discoloration on exposure to actinic rays, comprising chlorinated rubber and from 20% to 75%, based on said chlorinated rubber, of a non-conjugated, non-hydroxylated, vegetable oil which contains in each molecule an average of 2.5 to 6.0 epoxy groups of the formula

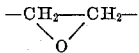

3. A coating composition, characterized by resistance to discoloration on exposure to actinic rays, comprising chlorinated rubber and, as a plasticizer and stabilizer therefor, from 20% to 75%, based on the chlorinated rubber, of epoxidized soybean oil containing an average of over 2.5 epoxy groups per molecule.

4. A coating composition, characterized by resistance to discoloration on exposure to actinic rays, comprising chlorinated rubber and, as a plasticizer and stabilizer therefor, from 20% to 75%, based on the chlorinated rubber, of epoxidized corn oil containing an average of over 2.5 epoxy groups per molecule.

5. A coating composition, characterized by resistance to discoloration on exposure to actinic rays, comprising chlorinated rubber and, as a plasticizer and stabilizer therefor, from 20% to 75%, based on the chlorinated rubber, of epoxidized cottonseed oil containing an average of over 2.5 epoxy groups per molecule.

WARREN D. NIEDERHAUSER.

REFERENCES CITED

The following references are of record in the file of this patent:

UNITED STATES PATENTS

| Number | Name | Date |
|---|---|---|
| 1,635,812 | Boehmer | July 12, 1927 |
| 2,013,336 | Bonney | Sept. 3, 1935 |
| 2,220,906 | Jordan et al. | Nov. 12, 1940 |
| 2,332,849 | Gruber et al. | Oct. 26, 1943 |
| 2,382,529 | Auer | Aug. 14, 1945 |
| 2,443,280 | Swern et al. | June 15, 1948 |
| 2,470,808 | De Groote et al. | May 24, 1949 |
| 2,492,201 | Swern et al. | Dec. 27, 1949 |

OTHER REFERENCES

"J. Soc. American Oil Chemists," June 1948, pages 193, 199, 260, 406.